United States Patent [19]

Suzuki et al.

[11] 4,155,377

[45] May 22, 1979

[54] HOT FLUID-CONDUCTING PIPE ASSEMBLY

[75] Inventors: Hiroshige Suzuki, Tokyo; Eizi Horie, Aichi; Hideo Nagashima, Tokyo, all of Japan

[73] Assignee: The President of the Agency of Industrial Science and Technology, Tokyo, Japan

[21] Appl. No.: 846,940

[22] Filed: Oct. 31, 1977

[30] Foreign Application Priority Data

Nov. 8, 1976 [JP] Japan ............................ 51-148977[U]

[51] Int. Cl.² .............................................. F16L 9/14
[52] U.S. Cl. ..................... 138/149; 138/153; 138/174; 138/177
[58] Field of Search ............... 138/149, 101, 153, 172, 138/174, 177, 155

[56] References Cited

U.S. PATENT DOCUMENTS

| | | | |
|---|---|---|---|
| 2,962,051 | 11/1960 | Burkes | 138/153 |
| 3,307,590 | 3/1967 | Carlson | 138/149 |
| 3,433,382 | 3/1969 | Boggio | 138/153 |
| 3,547,161 | 12/1970 | Reece | 138/149 |
| 3,979,818 | 9/1976 | Groch et al. | 138/149 |

*Primary Examiner*—Richard E. Aegerter
*Assistant Examiner*—L. Footland
*Attorney, Agent, or Firm*—Flynn & Frishauf

[57] ABSTRACT

A hot fluid-conducting pipe assembly, comprising an inner metal pipe through which flows a hot fluid,
  support pins regularly arranged on and outwardly projecting from the outer surface of the inner metal pipe,
  refractory of said coupling members fixed to the inner metal pipe by the support pins, each coupling members having upper and lower faces concentric with the surface of the inner metal pipe, trapezoidal side faces in the longitudinal direction of the inner metal pipe, and sectorial side faces in the circumferential direction of the inner metal pipe,
  heat-insulating refractory blocks mounted between the coupling members and each having an underside portion provided with a cushioning layer formed of an elastic refractory material,
  a heat-insulating layer formed of an elastic refractory material and uniformly covering the upper faces of the coupling members and of the heat-insulating blocks, and
  an outer metal pipe covering the heat-insulating layer.

6 Claims, 4 Drawing Figures

HOT FLUID-CONDUCTING PIPE ASSEMBLY

BACKGROUND OF THE INVENTION

This invention relates to a pipe assembly conducting a hot fluid, for example, a hot gas generated from a nuclear reactor.

In general, a pipe assembly conducting a hot fluid should be high in heat-insulating property and high in resistance against the thermal expansion of the inner metal pipe directly contacting the hot fluid. A conventional pipe assembly conducting a hot fluid is prepared by disposing refractory blocks such as bricks on the outer surface of the inner metal pipe, with a filler like mortar used for filling the clearances between the refractory blocks. However, a pipe assembly of this type is not satisfactory in heat-insulating property and durability. In particular, the filler tends to be broken because of the thermal expansion of the inner metal pipe. Quite naturally, the breakage of the filler should be avoided particularly where the pipe assembly is used for conducting a hot gas generated from a nuclear reactor.

SUMMARY OF THE INVENTION

An object of this invention is to provide a pipe assembly for conducting a hot fluid, which exhibits a high heat-insulating property and is capable of absorbing the expansion and shrinkage of the inner metal pipe, leading to a high durability.

Another object is to provide a pipe assembly for conducting a hot fluid, which does not use mortar for filling the clearances between the refractory blocks.

According to this invention, there is provided a hot fluid-conducting pipe assembly, comprising
  an inner metal pipe through which flows a hot fluid;
  support pins regularly arranged on and outwardly projecting from the outer surface of the inner metal pipe;
  refractory coupling members fixed to the inner metal pipe by the support pins, each of said coupling member having upper and lower faces concentric with the surface of the inner metal pipe, two trapezoidal side faces in the longitudinal direction of the inner metal pipe, and two sectorial side faces in the circumferential direction of the inner metal pipe;
  heat-insulating refractory blocks slidable on the side faces of the coupling members, mounted between the coupling members, and each having an underside portion provided with a cushioning layer formed of an elastic refractory material;
  a heat-insulating layer formed of an elastic refractory material and uniformly covering the upper faces of the coupling members and of the heat-insulating blocks; and
  an outer metal pipe covering the heat-insulating layer.

In a preferred embodiment of this invention, a plurality of support pin arrays each comprising at least two support pins equidistantly disposed on the circumference of the inner metal pipe are equidistantly provided in the longitudinal direction of the inner metal pipe. In this case, it is desired that a support pin included in any one of the support pin arrays be positioned on a longitudinal line including the center between two adjacent support pins included in the adjacent support pin array.

It is also preferred that the two trapezoidal side faces of the coupling member make an angle equal to half of the angle made by the two adjacent support pins of a support pin array.

DETAILED DESCRIPTION OF THE PREFERRED EMBODIMENT

Figure 1:
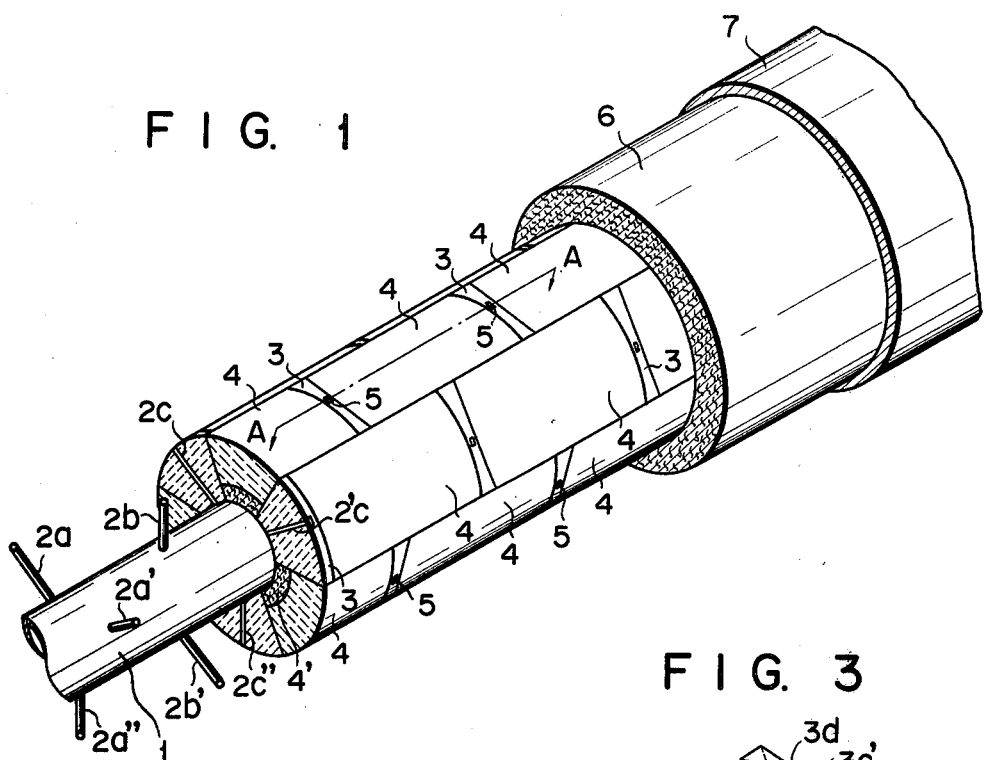
FIG. 1 is a perspective view, partly broken away, of a hot fluid-conducting pipe assembly according to one embodiment of this invention.
Figure 2:
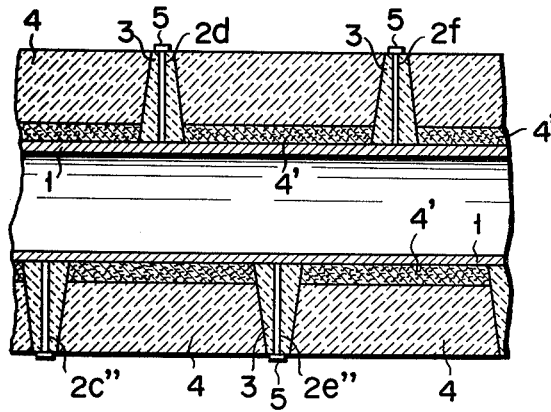
FIG. 2 is a cross sectional view along the line A—A of FIG. 1.

FIGS. 1 and 2 jointly show a pipe assembly according to one embodiment of this invention, in which each support pin array comprises three support pins equidistantly disposed on and outwardly projecting from the outer circumference of an inner metal pipe. Namely, the three support pins constituting a support pin array are included in a single plane perpendicular to the axis of the inner metal pipe. The number of support pins constituting a support pin array depends on the outer diameter of the inner metal pipe and the sizes of the coupling member and of the refractory block. Each support pin array is formed of, in general, 3 to 8 support pins and, typically, 3 or 6 support pins.

In the embodiment of FIGS. 1 and 2, the support pins constituting a support pin array, for example, support pins $2a$, $2a'$ and $2a''$ are mounted equidistantly along the circumference of an inner metal pipe 1 and project outwardly from the outer surface of the inner metal pipe 1. In other words, an angle of 120° is formed by two of the three support pins constituting a support pin array, for example, the support pins $2a$ and $2a'$. A plurality of support pin arrays each formed in the above-noted fashion are disposed equidistantly in the longitudinal direction of the inner metal pipe 1. It is important to note that two adjacent support pin arrays are deviant from each other by 60° with respect to the locations of the component support pins. For example, the planes including support pins $2b$ and $2b'$ included in the support pin array adjacent to the array of the support pins $2a$, $2a'$ and $2a''$ make an angle of 120° as in the case with the support pins $2a$ and $2a'$. However, the plane including both support pin $2b$ and the axis of the inner pipe makes an angle of 60° with the plane including both the support pin $2a$ and the axis of the inner pipe 1 as seen from FIG. 1. Both the inner metal pipe 1 and the support pins are made of a heat-resistant steel such as SUS 304 and are bonded to each other by, for example, welding.

Figure 3:
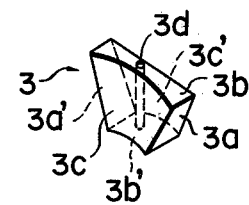
FIG. 3 is a perspective view of a coupling member used in this invention.

A coupling member 3, which is fixed to each support pin, is made of a heat-insulating refractory material such as sintered quartz glass, sintered silicon nitride and brick. As shown in FIGS. 2 and 3, the coupling member 3 is of a particularly shape. Namely, side faces $3a$, $3a'$ along the length of the inner metal pipe 1 are of a trapezoidal shape. Further, an upper face $3b$ and a lower face $3b'$ of the coupling member 3 are concentric with the surface of the inner metal pipe 1. It follows that side faces $3c$, $3c'$ in the circumferential direction of the inner pipe 1 are of a sectorial shape. Still further, the angle formed by the two trapezoidal side faces $3a$ and $3a'$ is equal to half of the angle formed by two adjacent support pins included in a support pin array. It is of particularly high importance to note that all the cross sections of the coupling member 3 in the longitudinal direction of the inner metal pipe 1 are of a trapezoidal shape.

The inclination angle of the sectorial side faces 3c, 3c' relative to a plane perpendicular to the axis of the pipe 1 depends on the thermal expansion coefficient and diameter of the pipe 1 as well as the distances between the support pins. In general, the inclination angle mentioned ranges from several degrees to scores of degrees. The coupling member 3 is provided with a bore 3d extending from the lower face 3b' to the upper face 3b. The support pin is inserted through the bore 3d and a fixing member 5 is fitted to the support pin at the tip so as to fix the coupling member 3 to the inner metal pipe 1.

Figure 4:
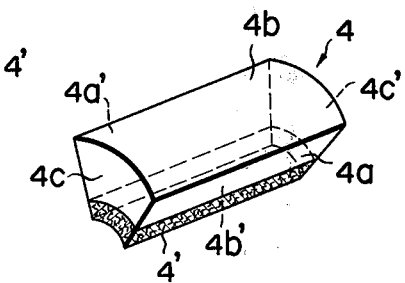
FIG. 4 is a perspective view of the heat-insulating refractory block used in the pipe assembly of FIG. 1.

A heat-insulating refractory block 4 is mounted between two coupling members adjacent to each other in the longitudinal direction of the pipe 1 as shown in FIGS. 1 and 2. The block 4 is made of a heat-insulating refractory material such as sintered quartz glass, sintered silicon nitride or brick. The underside portion of the block 4 comprises a cushioning layer 4' made of an elastic refractory material such as ceramic fiber. In FIG. 4, a reference numeral 4b' denotes the lower face of the block 4 which is brought into contact with the outer surface of the inner metal pipe 1.

The side faces 4a, 4a' of the heat-insulating refractory block 4 in the longitudinal direction of the pipe 1 are of a reversed trapezoidal shape. On the other hand, the upper face 4b and the lower face 4b' of the block 4 are the same as the upper face 3b and the lower face 3b' of the coupling member 3, respectively, in curvature and circumferential length. It follows that the side faces 4c, 4c' in the circumferential direction of the inner pipe 1 are of a sectorial shape and conform with the sectorial side faces 3c, 3c' of the coupling member 3.

In general, the heat-insulating refractory block 4 is larger than the coupling member 3 in length in the longitudinal direction of the inner metal pipe 1. Also, the block 4 and the coupling member 3 may be substantially the same in height.

A heat-insulating layer 6 shown in FIG. 1 is formed of an elastic refractory material such as ceramic fiber. Also, an outer metal pipe 7 shown in FIG. 1 is formed of a heat-resistant steel such as SUS 304.

In the pipe assembly described, the thermal expansion or shrinkage of the inner metal pipe directly contacting the hot fluid passing therethrough is absorbed by particular relative motions of the coupling member S3 and the refractory block S4, resulting in a marked improvement in durability of the pipe assembly. Suppose a gas of about 1,000° C. is passed through the pipe assembly. In this case, the inner metal pipe 1 directly contacting the hot gas is expanded mainly in the longitudinal direction. Naturally, the support pin and the coupling member 3 fixed thereto are also moved in the longitudinal direction of the inner pipe 1. But, the movement mentioned is converted into the sliding motion of the sectorial side faces 4c, 4c' of the block 4 along the sectorial side faces 3c, 3c' of the coupling member 3. To be more specific, the longitudinal expansion of the inner metal pipe 1 brings about an expansion of the interval between two adjacent coupling members 3 sandwiching the heat-insulating refractory block 4. Accordingly, the block 4 makes a sliding motion along the coupling member 3 toward the inner pipe 1 while compressing the cushioning layer 4'. The sliding motion naturally results in unevenness in the upper faces of the coupling member 3 and of the block 4. However, the elasticity of the insulating layer 6 serves to compensate for the unevenness mentioned above.

As described in detail, the side faces of the coupling member in the longitudinal direction of the inner metal pipe are of a trapezoidal shape. Further, the heat-insulating refractory block is shaped to be capable of sliding motions along the sectorial side faces of the coupling member. This particular construction renders it unnecessary to use mortar for filling the clearances between the heat-insulating refractory blocks and leads to a prominently improved durability of the pipe assembly.

Another feature to be noted is that the coupling members and the refractory blocks both covering the inner metal pipe are formed of a heat-insulating material. Further, the heat-insulating coupling members and blocks are covered with a heat-insulating layer made of ceramic fiber or the like. This construction naturally enables the pipe assembly to exhibit a high heat-insulating property. The durability and heat-insulating property of the pipe assembly are markedly improved particularly where a material containing sintered quartz glass as a major component is used as the heat-insulating refractory material.

As described in detail, the hot fluid-conducting pipe assembly according to this invention exhibits a high heat-insulating property and a high durability. Thus, the pipe assembly is particularly effective for conducting a hot gas generated from a nuclear reactor to a reduction furnace of iron ore or the like.

What we claim is:

1. A pipe assembly for conducting a hot fluid, comprising
    an inner metal pipe through which flows a hot fluid;
    a plurality of support pins outwardly projecting from the outer surface of the inner metal pipe and forming a plurality of support pin arrays each comprising at least two support pins equidistantly disposed on the circumference of the inner metal pipe, and the support pin arrays being equidistantly provided in the longitudinal direction of the inner metal pipe such that a support pin included in any of said support pin arrays is positioned on a longitudinal line including the center between two adjacent support pins included in the adjacent support pin array;
    a plurality of heat-insulating refractory coupling members fixed to the inner metal pipe by the support pins, each coupling member having trapezoidal side faces in the longitudinal direction of the inner metal pipe, sectorial side faces in the circumferential direction of the inner metal pipe, upper and lower faces concentric with the circumferential surface of the inner metal pipe, and a bore extending from the lower face to the upper face for receiving the support pin, the angle formed by the trapezoidal side faces being equal to half of the angle formed by two adjacent support pins included in a support pin array;
    a plurality of heat-insulating refractory blocks each mounted between two coupling members adjacent to each other in the longitudinal direction of the inner metal pipe, each of said refractory blocks having reversed trapezoidal side faces in the longitudinal direction of the inner metal pipe, sectorial side faces conforming with the sectorial side faces of the coupling member in the circumferential direction of the inner metal pipe and a cushioning layer formed of an elastic refractory material and comprising the lower portion of the heat-insulating refractory block;

a heat-insulating layer formed of an elastic refractory material and substantially uniformly covering the upper faces of the coupling members and of the heat-insulating refractory blocks; and an outer metal pipe covering the outer surface of the heat-insulating layer.

2. The pipe assembly according to claim 1, wherein the support pin array comprises from 3 to 8 support pins.

3. The pipe assembly according to claim 1, wherein the heat-insulating refractory material is selected from the group consisting of sintered quartz glass, sintered silicon nitride and brick.

4. The pipe assembly according to claim 1, wherein the elastic refractory material comprises ceramic fiber.

5. The pipe assembly according to claim 1, wherein the inclination angle of the sectorial side face of the coupling member relative to a plane perpendicular to the axis of the inner metal pipe ranges from several degrees to scores of degrees.

6. The pipe assembly according to claim 1, comprising a fixing member at the top of the support pin extending through the bore formed in the coupling member so as to fix the coupling member to the inner metal pipe.

* * * * *